P. SZUMINSKY.
TROLLEY.
APPLICATION FILED DEC. 4, 1911.

1,024,293.

Patented Apr. 23, 1912.

WITNESSES
Samuel Payne.
Ralph C. Evert.

INVENTOR
P. Szuminsky.
BY
ATTORNEYS

UNITED STATES PATENT OFFICE.

PETER SZUMINSKY, OF HAMILTON, ONTARIO, CANADA.

TROLLEY.

1,024,293.　　　　　Specification of Letters Patent.　　Patented Apr. 23, 1912.

Application filed December 4, 1911. Serial No. 663,738.

*To all whom it may concern:*

Be it known that I, PETER SZUMINSKY, a subject of the Czar of Russia, residing at Hamilton, Province of Ontario, Dominion of Canada, have invented certain new and useful Improvements in Trolleys, of which the following is a specification, reference being had therein to the accompanying drawings.

Figure 1:
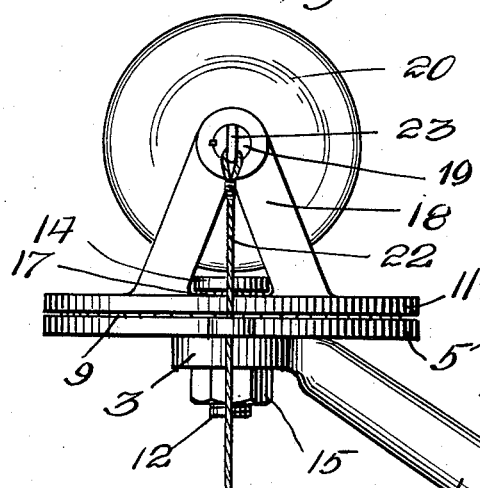
Figure 2:
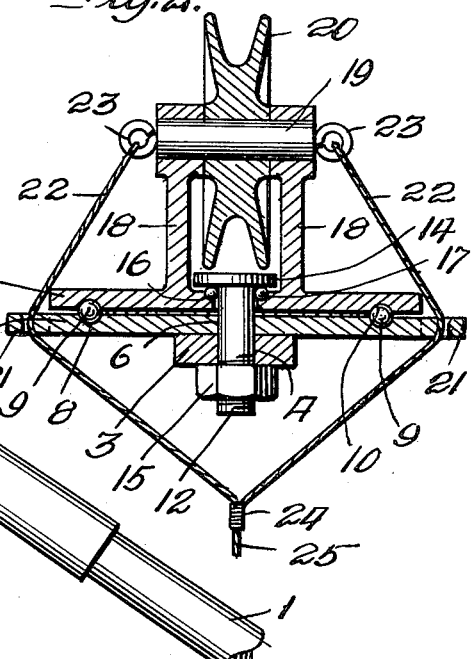
Figure 3:
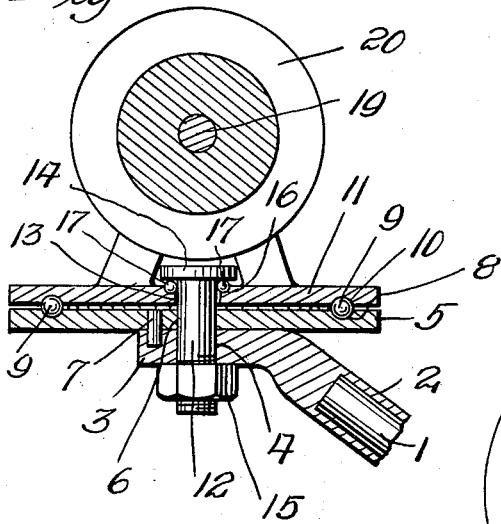
Figure 4:
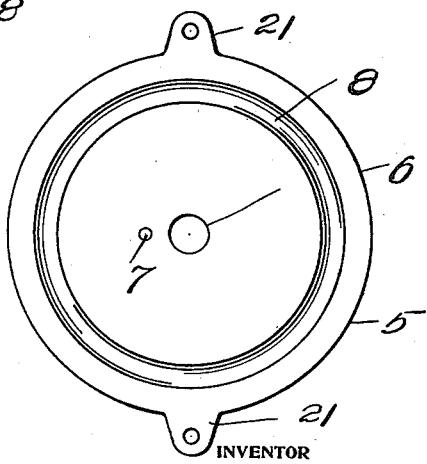

Figure 1 is a side elevation of a trolley in accordance with my invention, Fig. 2 is a cross sectional view of the same, Fig. 3 is a longitudinal sectional view of the same, and Fig. 4 is a plan of the trolley base.

My invention aims to provide a swiveled trolley harp that will prevent accidental displacement of the trolley wheel thereof relatively to a rail or trolley wire, the harp being arranged whereby the wheel thereof can be arranged to accommodate itself to the curvature of the wire or to any irregularities encountered in the wire.

A further object of this invention is to provide a trolley harp of the above type that consists of comparatively few parts inexpensive to manufacture and highly efficient for the purposes for which they are intended.

Reference will now be had to the drawing, wherein the reference numeral 1 denotes a portion of a trolley pole having the upper end thereof provided with a sleeve 2 supporting a horizontal bearing 3, said bearing having a vertical central opening 4.

Mounted upon the bearing 3 is a circular trolley base 5 having a central opening 6 alining with the opening 4. The circular trolley base 5 is prevented from rotating upon the bearing 3 by a pin 7 that extends through the trolley base into the bearing 3. The trolley base has an annular ball race 8 for anti-friction balls 9, said balls engaging in another race 10 formed in the under side of a circular harp plate 11. The harp plate 11 and the base 5 are retained upon the bearing 3 by a bolt 12 that extends through an opening 13 provided therefor in the plate 11, and the openings 6 and 4 of the base 5 and the bearing 3 respectively.

The upper end of the bolt 12 has the head 14 and the lower end thereof provided with a nut 15. The upper edges of the opening 13 have a ball race 16 for anti-friction balls 17 that are arranged under the head 14 of the bolt 12. The trolley plate 11 is provided with oppositely disposed A-frames 18 for a journal pin 19, and revolubly mounted upon said pin, between said frames, is a trolley wheel 20. This wheel is of the ordinary and well known type.

The trolley base 5 is provided with diametrically opposed apertured ears 21 and extending through said ears are branch cords or cables 22 having the upper ends thereof connected to eyes 23, carried by the ends of the journal pin 19. The lower ends of the branch cords or cables are attached, as at 24 to a single cord or cable 25 that extends downwardly to the car or vehicle, whereby the operator or conductor of the car or vehicle can center the trolley wheel 20, when placing the same in engagement with a rail or trolley wire.

Under ordinary operating conditions, the harp is free to revolve upon the base 5, and the manner of swiveling the harp prevents undue wear or tear due to a movement of said harp upon the base. The trolley harp in its entirety can be made of light and durable metal and advantageously used in connection with high speed suburban electric railways.

What I claim is:—

In a trolley, the combination with a pole having the upper end thereof provided with a horizontal bearing, of a circular trolley base mounted upon said bearing and having an annular ball race formed therein, anti-friction balls arranged in said race, a circular trolley plate revolubly mounted upon said balls, a bolt extending through said trolley plate, said base and said bearing, a head carried by the upper end of said bolt, anti-friction balls interposed between said head and said harp plate, a nut screwed upon the lower end of said bolt, A-frames carried by said trolley plate, a journal pin mounted in said A-frames, a trolley wheel revolubly mounted upon said pin, diametrically opposed apertured ears carried by said trolley base, branch cords extending through said ears and having the upper
5 ends thereof connected to the ends of said journal pin, a single cord connecting the lower ends of said branch cords, and means carried by said trolley base and engaging said bearing for preventing said base from rotating relatively to said bearing. 10

In testimony whereof I affix my signature in the presence of two witnesses.

PETER SZUMINSKY.

Witnesses:
CHAS. BUDNER,
ISIDOR SÖZLA.

Copies of this patent may be obtained for five cents each, by addressing the "Commissioner of Patents, Washington, D. C."